Feb. 20, 1940     H. M. CARLETON     2,190,754
FILM PROCESSING TANK
Filed March 10, 1939     2 Sheets-Sheet 1
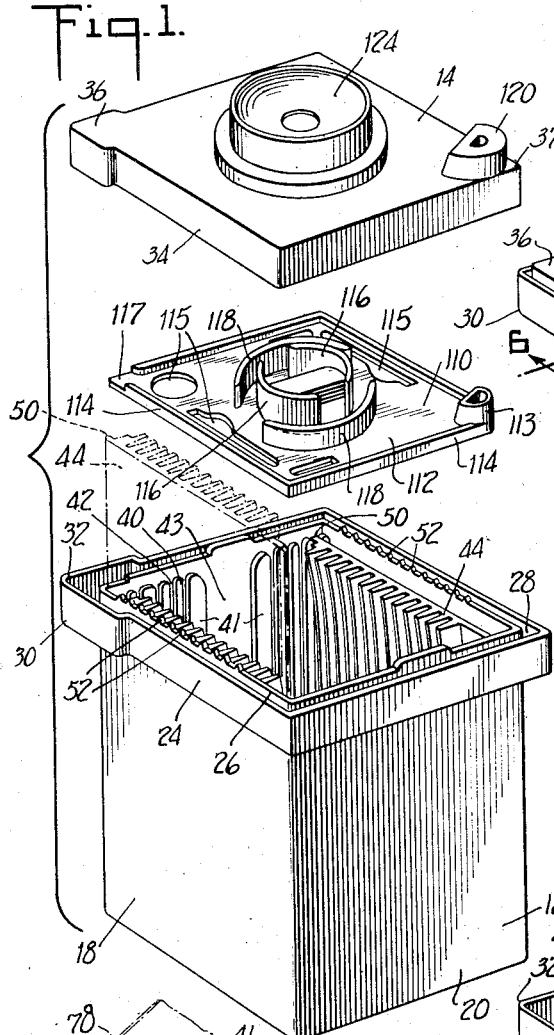
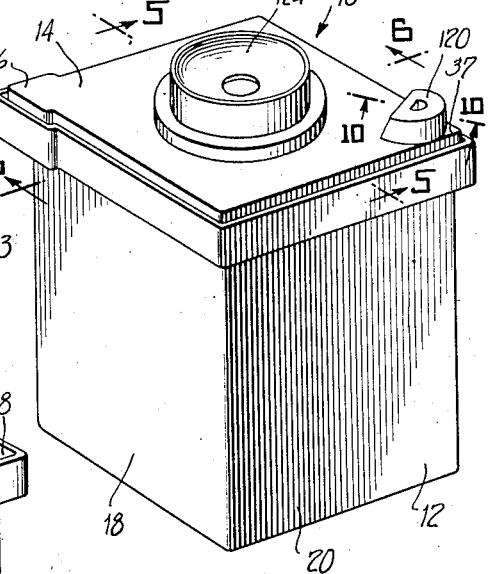
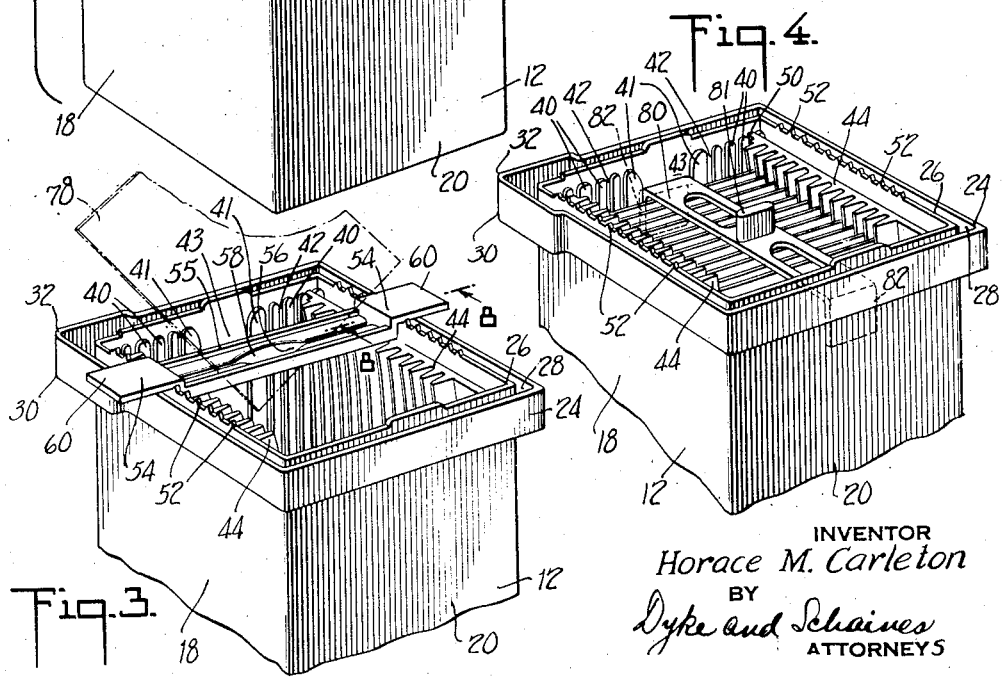
INVENTOR
Horace M. Carleton
BY
Dyke and Schaines
ATTORNEYS Feb. 20, 1940.    H. M. CARLETON    2,190,754
FILM PROCESSING TANK
Filed March 10, 1939    2 Sheets-Sheet 2
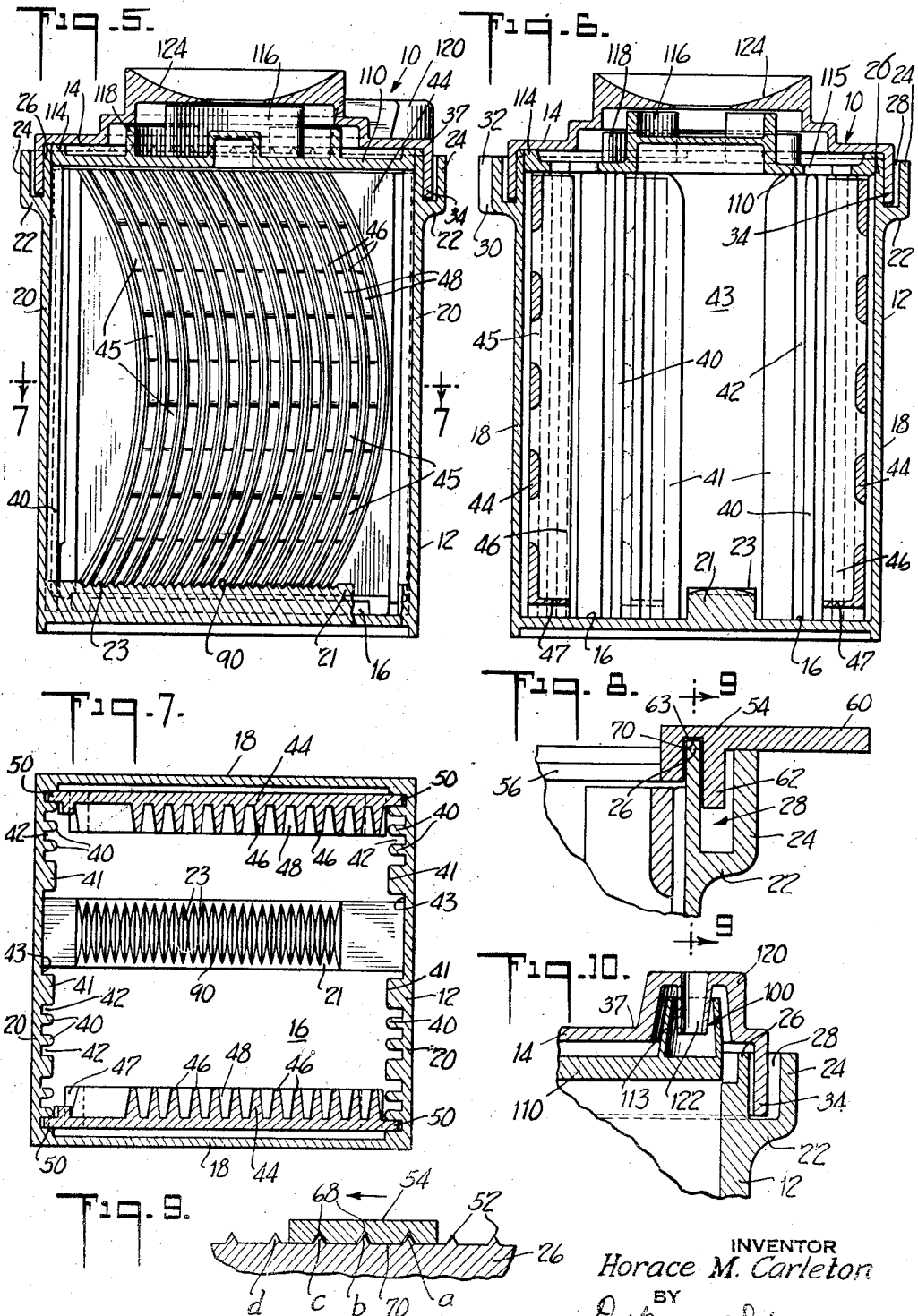
INVENTOR
Horace M. Carleton
BY
Dyke and Lehaines
ATTORNEYS Patented Feb. 20, 1940

2,190,754

UNITED STATES PATENT OFFICE 2,190,754

FILM PROCESSING TANK

Horace M. Carleton, New York, N. Y.

Application March 10, 1939, Serial No. 260,975

13 Claims. (Cl. 95—90)

My invention relates generally to receptacles— or tanks as they are commonly known—for the processing of light sensitive materials, such as photographic or X-ray films or the like. Specifically, my invention relates to a receptacle for the processing of cut film, or film of film packs. The mechanical steps in the processing of cut individual cut films, or films from film packs, are different from the processing of roll films or film strips, and my invention is not directed to any apparatus for processing roll or strip film except as it may possibly be used therefor.

Various receptacles or tanks for the treatment of glass plates and even cut film and film of film packs have long been known, but for one reason or another have proven unsatisfactory in use. The handling of rigid glass sensitized plates involves problems entirely different from those encountered in the treatment of the films of film packs and cut film having cellulose acetate or cellulose nitrate bases, and none of the devices known or in use satisfactorily provide for the proper handling of the relatively pliable cut film or film of film packs during treatment, to keep the films from twisting and sagging and out of contact with one another during processing. Photographic films have a strong tendency to curl inwardly on the emulsion side and they become relatively soft and pliable when wetted during the various chemical processing steps, and their proper handling involves technique not used in the processing of any other film.

It is an object of my invention to provide, in a tank for processing cut film and the like, means for flexing the film and maintaining the same in said flexed position under tension during the entire processing operations.

It is a further object of my invention to provide, in a device of the character specified, means for maintaining the films in flexed position and means for securing same along all the curved edges thereof.

It is a further object of my invention to provide, in a device of the character described, a pair of opposing relatively movable members having a plurality of arcuate film receiving grooves therein for holding the films by their side edges.

It is a further object of my invention to provide, in a device of the character specified, a pair of opposing arcuately grooved relatively movable members for holding the films by their side edges, in combination with means to secure the films at their top and bottom edges.

It is a further object of my invention to provide, in a device of the character specified, a pair of opposed members for holding films by their curved side edges within spaced arcuate grooves, in combination with studs on the bottom of the device to secure the films in spaced relation at their bottom edges.

It is a further object of my invention to provide, in a device of the character specified, a movable member cooperating with the film receiving members, whereby films may be easily and positively loaded thereinto.

It is a further object of my invention to provide, in a device of the character specified, a movable member and means to bring same successively into cooperative relation with each of the grooves in the film receiving members whereby the tank can be loaded in the dark positively, simply and easily, and the possibility of inserting two films in any one groove is minimized.

It is a further object of my invention to provide, in a device of the character described, an air escape vent which will facilitate rapid loading of the tank with processing fluids and rapid decanting same therefrom.

It is a further object of my invention to provide a closure for a device of the character described, comprising a baffle plate and a cover which cooperate to make the closure light-tight.

It is a further object of my invention to provide a light-tight cover for a device of the character specified having an integral raised funnel and a baffle plate cooperating and interfitting therewith to provide a light-tight arrangement, whereby the processing operations, after the tank has been loaded, can safely be carried on in the presence of light.

In the drawings annexed hereto and forming a part hereof for purposes of illustration, and not for limitation, Figure 1 is an exploded perspective view of the tank, cover, baffle plate and casing;

Fig. 2 is a perspective view of the casing with the cover in place thereon;

Fig. 3 is a perspective view of the upper portion of the casing illustrating one step of the film loading operation;

Fig. 4 is a perspective view of the upper portion of the receptacle showing the films loaded in place therewithin, with the retainer bar overlying the upper edges of the films;

Fig. 5 is a vertical section through the tank along the line 5—5 of Fig. 2;

Fig. 6 is a vertical section through the tank along the line 6—6 of Fig. 2;

Fig. 7 is a horizontal section through the tank along the line 7—7 of Fig. 5;

Fig. 8 is an enlarged horizontal section through the receptacle along the line 8—8 of Fig. 3;

Fig. 9 is an enlarged vertical section along the line 9—9 of Fig. 8; and

Fig. 10 is an enlarged vertical section through the tank along the line 10—10 of Fig. 2 showing the air vent construction.

Reference number 10 indicates the receptacle or tank generally, which comprises casing 12 and cover 14. Casing 12 while shown to be square in cross section (see Fig. 7), may be of any rectangular shape and comprises bottom or floor 16, side walls 18, 18, and front and back walls, 20, 20. As shown, the side walls and front and back walls are all the same width, though they need not be, and if desired, the dimensions of the casing may be of any desired size in order to accommodate films of any special size. The front, back and side walls, 18, 20, at the top thereof are shouldered outwardly and upwardly as at 22, 24, respectively, to define, with wall extensions 26, a channel 28 which extends around the four sides of the casing at the top thereof.

Channel 28 is flared outwardly at one corner 30 to form a pouring spout 32, to facilitate decanting the tank contents.

Cover 14 is also rectangular in shape, and has formed as an integral part thereof, a downwardly depending wall 34 which interfits with and is received into channel 28. Wall 34, to correspond and interfit with the pouring spout 32, is also extended outwardly at one corner 36 and the interfitting relationship between cover wall 34 and the walls 24, 26 of channel 28 is light-tight (see Figs. 5, 6 and 10).

Floor 16 within the casing 12 is provided with a raised integral platform 21 which extends from front to back of the casing. The top of platform 21 is provided with a plurality of transverse pointed ridges or studs 23, the exact shape and function of which will be discussed below. On both sides of platform 21, front and back walls 20, 20 are provided with a number of vertically aligned and opposing ribs, 40, 40, which ribs are spaced apart to define aligned vertical channels or guideways 42 therebetween on opposite sides of the receptacle extending from the top to the bottom thereof. The sets of ribs 40 on the front wall are directly opposed to the ribs 40 on the rear wall, as necessarily are the channels 42. Adjacent platform 21, on opposite sides thereof, walls 20, 20 have formed thereon enlarged and widened ribs 41, 41 defining a slot 43 therebetween slightly wider than platform 21, the purpose of which will also be discussed below.

A pair of substantially flat slide members 44, 44 are provided, each of which has formed on one side thereof a number of arcuate ribs 46, equi-distantly spaced apart to define arcuate and parallel channels 48 therebetween. A horizontal platform 47 is provided at the bottom of each slide to close the lower ends of the arcuate channels. I employ the term "arcuate and parallel" to indicate that all the ribs 46 are equi-distantly spaced from each other.

Slides 44, 44 have side extensions 50, 50 of width sufficient to fit within aligned channels 42, 42 easily and slidably. As illustrated, slides 44, 44 have been placed in the outermost of the guideways 42, 42 in order to accommodate films of the maximum width for said tank, but slides 44, however, may be placed in any of the channels 42 on opposite sides of platform 21 to accommodate films of different widths. In practice, slides 44, 44 are so disposed with relation to each other as to have platform 21 between them. Slides 44 are provided with a number of inter-rib apertures 45 therethrough, so that the processing liquids can pass therethrough freely and easily contact all portions of the films being treated.

The top edges of extension walls 26, 26 on the side walls of the casing are provided with a number of transversely aligned projections 52, 52 which serve as locating means for a member 54 which I have developed to facilitate proper loading of the films into the casing. As illustrated in Figs. 3 and 8, this loading bar member 54 comprises a body portion 55 which has an elongated medial slot 56 extending the length thereof. Slot 56 is widened at the center of the body portion, as at 58, Fig. 3, to provide an enlarged entering opening for the film. Handle portions 60, raised with respect to the body 54, are provided at each end of the member, and a depending flange 62 is formed on the underside of each of the gripping portion. Bar 54 is channelled on the underside thereof adjacent flange 62, as at 63, and when bar 54 is disposed on the tank casing so that the inner wall extensions 26 project upwardly into channel 63, flange 62 projects and fits down into the casing channel 28, and the tank is ready for the loading operations. A number of the uniformly spaced depressions 68 are formed within the floor 70 of channel 63, as seen in Fig. 9, and when the loading bar is placed on the casing 20 in the position illustrated in Fig. 3, projections 52 fit within depressions 68 to locate the slot 56 in the loading bar in line with a film channel 48 in the slide members 44.

Before the film insertion is started, the slides 44 are slid into the casing within those vertical opposing channels 42 as to properly space same to accommodate the particular size of film being treated. Thereupon loading bar 54 is placed on the casing with the longitudinal slot 56 aligned with the endmost of the arcuate channels 48 defined by the spaced apart and opposing slides 44. A film 78 is threaded into the loading bar by a corner thereof (as shown in Fig. 3) within the widened opening 58, and after the corner is securely in, the film is fed continually so that the vertical edges thereof engage the channels 48 and the film is slid downward through the loading bar and into the interior of the casing until it rests on platform 21. The film 78, following the arcuate channels 48 down into the tank, is curved along its vertical axis; that is, the film is buckled along its length as it is slid into the tank because of the arcuate character of the channels. The loading bar is then raised to disengage the projections 52 from the corresponding depressions 68, and moved forward such distance that the depressions 68 are engaged by the next pair of aligned projections 52, 52 on walls 26. The second film is then slid similarly into the arcuate channels down into the casing, and so on, until all the films are in place, or until the available arcuate grooves are filled. Referring to Fig. 9, projections a, b and c are engaged by the loading bar for one channel 48. After a film is inserted within the channel, bar 54 is raised and moved along the direction of the arrow into engagement with projections b, c and d, and a fresh film inserted, and so on.

When all the films are in the tank, the loading bar is lifted out and pressure bar 80 is then placed over the top edges of the film. Bar 80, provided with a hand grip 81 has formed on each side thereof a downwardly extending integral flange 82, which flanges, 82, 82 are normally sprung outwardly to spring fit within the channel 43 formed by the enlarged ribs 41. Bar 80, after being sprung into channels 43, is gently pressed downwardly bearing against the tops of the films and carrying them along until the lower edges of all the films rest on platform 21 and are engaged by the platform projections 23.

As seen in Fig. 7, the number of projections 23 (and hence depressions) is far in excess of the number of film grooves, and the sides of the projections are rounded upwardly to a narrow edge as at 90. Thus, when the spaced-apart leading edges of the films are moved downwardly, each film will engage a different edge 90 and will be moved into a different space between the ridges 23 to secure the films being separated at the bottom. The fact that the number of ridges far exceeds the number of channels guarantees the films falling into inter-ridge spaces, and makes it impossible for any one film to contact another during the processing steps, because, in addition to being spaced apart by their longitudinal edges, the lower edges of the film are also held in spaced relation against any back or forward movement of the tank during the processing steps. The pressure bar 80 may be kept in place during the entire processing operations and it will be seen that in addition to being held by their longitudinal edges and their lowermost edges, the films are also secured at the top edges against any contact with one another. If desired, the underside of pressure bar 80 may be transversely scored to space the films against movement, but pressure of the bar against the films will keep them under sufficient tension to guarantee against any contact between them.

After the films have been threaded into the casing between slides 44 and are locked as above described, a baffle plate 110 is placed on the casing. Baffle plate 110 comprises a flat bed portion 112 of such shape as to readily fit within the tank, and is provided with an upstanding wall 114 therearound except at one corner 117, where a gap is left to permit ready pouring. The plate 110 is so disposed within the casing on top of slides 44 that the open corner 117 coincides with the casing pouring spout corner 32. The corner on the plate 110, which is diagonally opposite from the pouring corner 117, has formed as an integral part thereof an upstanding circular well 113 shaped like a truncated cone. A plurality of openings 115 are formed through the body portion of the plate, and in the center of the plate 110, I provide a number of concentric, broken, annular walls 116, 118, the innermost 116 of which are higher than the outermost. Corner 37 of cover 14, which is opposite from the pouring corner 36, is provided with a raised platform portion 120, which has a downwardly extending apertured nozzle 122 formed therein to form a light-tight interfit with the baffle well 113, as at 100.

In the center of the cover, I form an integral raised funnel 124 having an opening in the center thereof directly over the center of the concentric baffle walls 116, 118, and when the cover is properly fitted on top of the casing, in the position of Figs. 5 and 6, the concentric baffle walls 116, 118 are received within the recess defined by the raised funnel, to provide a light-tight fluid passage between the funnel and the interior of the casing. The discontinuous nature of the concentric walls 116, 118 and the baffle openings 115 allows ready pouring and decanting of the tank contents with no danger of light flashes fogging the film during treatment. This arrangement makes it possible, once the films are loaded and the cover and baffle placed, to operate in the presence of light.

When it is desired to pour off the contents of the tank, the tank is tilted to depress the pouring corner 30. The interlocking arrangement of the air vent at 100 (Fig. 10) permits ready ingress of air when the fluid is poured, rendering this operation simple and swift. When pouring chemicals into the tank the air vent arrangement similarly makes it possible to quickly fill the tank, to the desired level. This is an important feature of my structure since, with the very sensitive emulsions of present day films, there is the ever-present danger that if the processing chemicals are poured into or out from the tank slowly, the lower portions of the film may be processed for a longer time than of the upper portions of the film. With the above arrangement, filling my tank and decanting same is a matter of seconds rather than minutes despite the large capacity of the tank.

My tank, as a complete entity, comprises the casing 12, baffle 110, cover 14, slides 44, 44, loading bar 54 and pressure bar 80, seven members in all. Each of these may be molded or otherwise formed of Bakelite, or other suitable plastic material. Ribs 40 and projections 52 are all formed as an integral part of the casing.

My construction can be readily adapted for use with films of different width easily and quickly. The films are loaded into their curved channels quickly and easily, and proper use of my loading bar makes it impossible to insert two films into one channel. The arcuate nature of the film channels places and keeps the films under tension during the entire processing operations; keeps the films spaced apart one from the other, and avoids all danger of blotting one film against the other; and reduces to a minimum the contact between the films and slides.

Having described my invention, what I claim and desire to secure by Letters Patent is:

1. A tank for processing cut film comprising a substantially rectangular casing having front, back, a pair of side walls, a floor, and a closure, a pair of separate members vertically slidable into and out of the casing, the opposing faces of said members having formed therein a plurality of opposed arcuate and parallel film receiving grooves whereinto the film is slid from the top and buckled along its length as it moves down into the tank, and vertical guiding means disposed within the tank to support the said separate members vertically within the casing and in parallel and spaced apart relationship.

2. A film processing tank comprising a substantially rectangular casing having front, back, a pair of side walls, a floor, and a closure, said front and back walls having formed therein a plurality of opposing vertical channels, and a pair of separate members slidable within said channels into and out of the casing, the opposing faces of said members having formed therein a plurality of opposed arcuate and parallel film receiving grooves.

3. A film processing tank comprising a substantially rectangular casing having front, back, a pair of side walls, a floor, and a closure, said front and back walls having formed therein a plurality of opposing vertical ribs spaced apart to define vertical channels, and a pair of separate members slidable within said channels into and out of the casing, the opposing faces of said members having formed therein a plurality of opposed arcuate ribs spaced apart to define opposed arcuate and parallel film receiving grooves.

4. A film processing tank comprising a substantially rectangular casing having front, back, a pair of side walls, a floor and a closure, said front and back walls having formed therein a plurality of opposing vertical channels, a pair of members slidable within said channels into and out of the casing, the opposing faces of said members having formed therein a plurality of arcuate film receiving grooves, said floor having an elevated platform thereon the top of which is above the bottom of the arcuate grooves when the slidable members are disposed within the casing.

5. A device as in claim 4 in which the top of the platform is provided with a plurality of film receiving and spacing means.

6. A device as in claim 4 in which the top of the platform is provided with substantially twice as many film receiving and spacing means as there are arcuate grooves.

7. A film processing tank comprising a casing having front, back and a pair of side walls, a floor and a closure, a plurality of fixed opposed film receiving grooves within the casing, a movable member for guiding film into the interior of the casing, and means on the top of the casing walls for securing the guiding member during movement in successive alignment with the several film receiving grooves.

8. Device as in claim 7, in which the movable guiding member comprises a bar having a longitudinal slit therein through which the film is threaded into the grooves successively in registry therewith.

9. Device as in claim 7 in which the movable guiding member comprising a longitudinally slotted bar has means on the underside thereof which cooperate with the guide securing means on the top of the casing walls to successively lock the said guide member in alignment with the opposed film receiving grooves.

10. A film processing tank comprising a casing having front, back, a pair of side walls, a floor, and a closure therefor, said closure comprising a separate baffle plate member and a cover member interfitting the baffle plate to make a light-tight closure for said casing, the baffle plate member being easily separable from the cover.

11. Device as in claim 10 in which the cover is provided with a raised portion having a downwardly projecting funnel, and the baffle plate is provided with upstanding concentric discontinuous annular wall members which fit within the raised portion of the cover and make a light tight fit therewith, the baffle having a plurality of openings around the annular walls whereby, when the cover and baffle are interfitted, liquid poured into the funnel will flow freely and quickly through and around the wall members, through the baffle plate openings and into the interior of the casing.

12. A film processing tank as in claim 10, in which the baffle plate member is provided with an upwardly extending well member in one corner thereof, and the cover is provided, in one corner thereof, with a downwardly projecting nozzle, and the well and nozzle interlock, when the baffle plate is interfitted with the cover, to form an air vent at the top of the casing.

13. A device of the character described comprising a substantially rectangular casing having front, back and a pair of side walls, a plurality of vertical opposed grooves in the front and back walls, a pair of members slidable in said grooves the opposed faces of which have opposed arcuate film receiving grooves therein, an elevated platform of the floor of said casing extending across from the front to back wall, a baffle plate provided with upstanding concentric annular broken walls, a cover having a raised central portion receiving the upstanding baffle walls, an upstanding well on one corner of the baffle plate, and a downwardly extending nozzle on one corner of the cover interfitting with said well.

HORACE M. CARLETON.